United States Patent
Dunning et al.

(10) Patent No.: US 12,361,132 B2
(45) Date of Patent: Jul. 15, 2025

(54) VERIFYING SECURITY FOR VIRTUAL MACHINES IN CLOUD STREAMING SYSTEMS AND APPLICATIONS

(71) Applicant: NVIDIA Corporation, Santa Clara, CA (US)

(72) Inventors: Lucien Dunning, Ramsey, NJ (US); Seth Schneider, San Jose, CA (US); Dwayne Swoboda, San Jose, CA (US); Marko Mitic, San Jose, CA (US); Adam Zabrocki, Kings Park, NY (US)

(73) Assignee: NVIDIA Corporation, Santa Clara, CA (US)

( * ) Notice: Subject to any disclaimer, the term of this patent is extended or adjusted under 35 U.S.C. 154(b) by 255 days.

(21) Appl. No.: 18/151,175

(22) Filed: Jan. 6, 2023

(65) Prior Publication Data
US 2024/0232360 A1   Jul. 11, 2024

(51) Int. Cl.
*G06F 21/57*    (2013.01)
*A63F 13/73*    (2014.01)

(52) U.S. Cl.
CPC ............ *G06F 21/57* (2013.01); *A63F 13/73* (2014.09)

(58) Field of Classification Search
CPC ........... G06F 21/57; G06F 21/53; A63F 13/73
See application file for complete search history.

(56) References Cited

U.S. PATENT DOCUMENTS

| | | | | |
|---|---|---|---|---|
| 11,374,745 | B1 * | 6/2022 | Khare | H04L 9/06 |
| 2010/0141664 | A1 * | 6/2010 | Rawson | G06T 1/20 |
| | | | | 345/502 |
| 2011/0270991 | A1 * | 11/2011 | Zawacki | H04L 63/0861 |
| | | | | 709/227 |
| 2012/0254439 | A1 * | 10/2012 | Yamasaki | G06F 9/505 |
| | | | | 709/226 |
| 2015/0029200 | A1 * | 1/2015 | Khosa | G06F 9/00 |
| | | | | 345/522 |

(Continued)

FOREIGN PATENT DOCUMENTS

| KR | 20210068587 A | * | 6/2021 | |
|---|---|---|---|---|
| WO | WO-2015038690 A1 | * | 3/2015 | ............ G06F 21/57 |
| WO | WO-2020053469 A1 | * | 3/2020 | |

OTHER PUBLICATIONS

Berger, S., et al.; "vTPM: Virtualizing the Trusted Platform Module"; IBM T.J. Watson Research Center, Security '06: 15th USENIX Security Symposium, 2006, 16 pgs.

*Primary Examiner* — John B King
(74) *Attorney, Agent, or Firm* — Taylor Duma L.L.P.

(57) ABSTRACT

In examples, a VM may receive and aggregate a first attestation report corresponding to a CPU and a second attestation report corresponding to a GPU. The aggregated data may be provided to an attestation service, which may verify the attestation reports indicate a TCB is to include the VM and GPU state data and is to isolate the GPU state data and the VM from an untrusted host OS. Based at least on the TCB being verified, the VM may perform one or more operations using the TCB. The TCB may include a trusted hypervisor to isolate the VM and GPU state data within the GPU(s) from the untrusted host OS. The trusted hypervisor may prevent the host OS from accessing device memory assigned to the VM based at least on controlling an IOMMU and/or second-level address translation (SLAT) used to access the data.

21 Claims, 9 Drawing Sheets

(56) References Cited

U.S. PATENT DOCUMENTS

| | | |
|---|---|---|
| 2015/0106660 A1* | 4/2015 | Chumbalkar ....... G06F 11/3058 |
| | | 711/104 |
| 2015/0113527 A1 | 4/2015 | Diard et al. |
| 2016/0191627 A1 | 6/2016 | Huang et al. |
| 2017/0142201 A1 | 5/2017 | Holmes |
| 2017/0173262 A1* | 6/2017 | Veltz ...................... G16H 20/17 |
| 2018/0192081 A1 | 7/2018 | Huang et al. |
| 2019/0012489 A1* | 1/2019 | Gligor ..................... G06F 21/57 |
| 2020/0089888 A1* | 3/2020 | Kelly ..................... G06F 21/604 |
| 2020/0179803 A1 | 6/2020 | Holmes |
| 2021/0349734 A1* | 11/2021 | Novales ................ G06F 9/5077 |
| 2022/0012042 A1* | 1/2022 | Doshi ................... H04L 41/082 |
| 2022/0084157 A1* | 3/2022 | Wang ........................ G06T 1/20 |
| 2022/0114009 A1* | 4/2022 | Ismael .................. G06F 9/5077 |
| 2023/0289204 A1* | 9/2023 | Ismael .................... H04L 63/20 |
| 2023/0336629 A1* | 10/2023 | Ohara ................. H04L 41/0846 |
| 2024/0070260 A1* | 2/2024 | Proskurin ............... G06F 21/53 |
| 2024/0286043 A1 | 8/2024 | Dunning et al. |

\* cited by examiner

VERIFYING SECURITY FOR VIRTUAL MACHINES IN CLOUD STREAMING SYSTEMS AND APPLICATIONS

BACKGROUND

Video games, particularly games that are played online with others, are increasingly being used for entertainment, socialization, and competition (e.g., via eSports). With this increase, there has also been a rise in cheating and techniques that enable cheating, as participants seek to gain an advantage over other participants or attempt to accomplish previously unrecorded achievements. Some cheating techniques augment the information available to a player, for example, allowing the player to see opponents through walls, or otherwise know opponent health, location, items, or other in-game information. Other cheating techniques augment player inputs, such as to aim more precisely or with greater stability, trigger more quickly, for a player or nudge a player cursor. Still other cheating techniques disable in-game effects, such as smoke or fog that would otherwise obscure the player's vision. Additionally, some cheating techniques transform player inputs, such as to increase cursor stability or to compensate for in-game effects.

Conventional approaches to countering cheating in games have involved installing anti-cheat software on the operating system (OS) that runs or hosts the games. The software may attempt to detect particular cheating techniques and take a remedial action when a cheat is detected. As new techniques for cheating as well as circumventing detection of employed cheating techniques are constantly being developed, the anti-cheat software must be frequently updated to compensate for these developments, if known. Additionally, because the anti-cheat software is installed on the OS, it has an equal or lesser privilege level than the user, making bypassing the protection and detection mechanisms easier.

SUMMARY

Embodiments of the present disclosure relate to managing the use of computing system resources for trusted or secure virtual machine (VM). In particular, the disclosure relates to approaches for architecturally securing VMs that employ graphics processing units (GPUs) in a system from security threats, such as cheating in video games. The disclosure further relates to approaches for verifying VMs that use GPU state data are operating in an architecturally secure environment.

In contrast to conventional approaches, such as those described above, disclosed approaches may verify a trusted computing base (TCB) is to isolate a VM and GPU state data within a GPU(s) from an untrusted host operating system (OS). One or more actions may be performed or permitted (e.g., a user may be permitted to join an online multiplayer gaming session) based on a determination of whether the TCB is verified. To perform the verification, data corresponding to an attestation report(s) may be provided to an attestation service (e.g., associated with a game service), which may verify that the attestation report(s) indicate the TCB is to include the VM and the GPU state data and that the TCB is to isolate the GPU state data and the VM from the untrusted host OS. Further aspects of the present disclosure provide approaches for a TCB to architecturally isolate a VM and GPU state data within a GPU(s) from an untrusted host OS. In one or more embodiments, the TCB may include a trusted hypervisor to isolate the VM and GPU state data within the GPU(s) from the untrusted host OS. The trusted hypervisor may isolate the VM and the GPU state data from the untrusted host OS based at least on controlling one or more isolation primitives.

BRIEF DESCRIPTION OF THE DRAWINGS

The present systems and methods for securing virtual machines in cloud streaming systems and applications are described in detail below with reference to the attached drawing figures, wherein.

DETAILED DESCRIPTION

Figure 1:
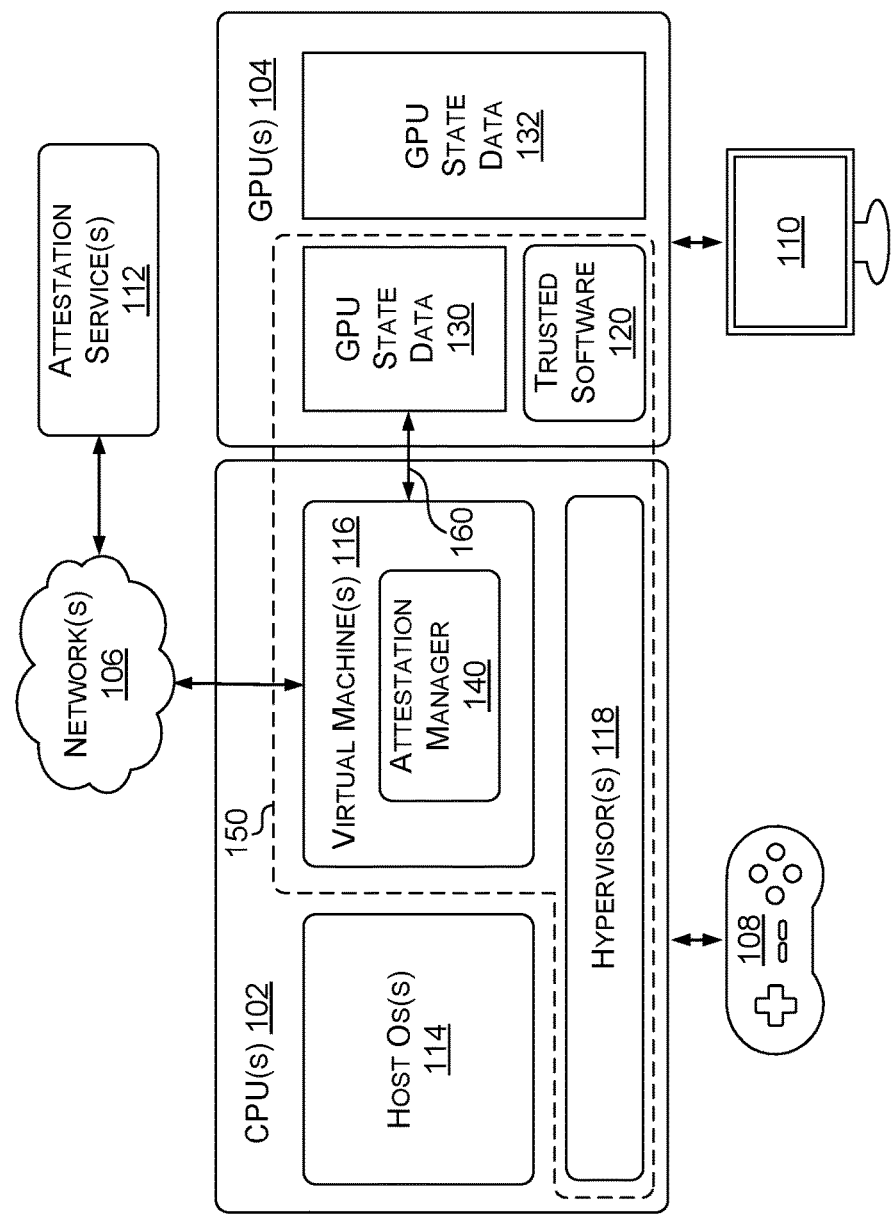
FIG. 1 depicts an example of a trust verification system, in accordance with some embodiments of the present disclosure.

The present disclosure relates to trusted virtual machine (VM) usage of graphics processing unit (GPU) resources for gaming or other applications. In particular, the disclosure relates to approaches for architecturally securing VMs that employ GPUs from security threats, such as cheating in video games. The disclosure further relates to approaches for verifying VMs that use GPU state data are operating in an architecturally secure environment.

In contrast to conventional approaches, such as those described above, disclosed approaches may verify a trusted computing base (TCB) is to isolate a VM and GPU state data within a GPU(s) from an untrusted host operating system (OS). One or more actions may be performed based on whether the TCB is verified. For example, the VM may perform one or more operations using the TCB (e.g., the GPU state data), a server may enable the VM to perform one or more operations using the TCB, the service may permit a user associated with the VM to join an online multiplayer gaming session, etc. In one or more embodiments, to perform the verification, one or more attestation reports may be generated using the GPU(s) and one or more central processing units (CPUs) executing the untrusted host OS. For example, the VM may receive a first attestation report(s) corresponding to a chain of trust(s) rooted in the CPU(s) and a second attestation report(s) corresponding to a chain of trust(s) rooted in the GPU(s). Data corresponding to the attestation report(s) may be provided to an attestation service (e.g., associated with a game service), which may verify the attestation report(s) indicate the TCB is to include the VM and the GPU state data and is to isolate the GPU state data and the VM from the untrusted host OS.

Further aspects of the present disclosure provide approaches for a TCB to architecturally isolate a VM and GPU state data within a GPU(s) from an untrusted host OS. In one or more embodiments, the TCB may include a trusted hypervisor to isolate the VM and GPU state data within the GPU(s) from the untrusted host OS. The trusted hypervisor may isolate the VM and the GPU state data from the untrusted host OS based at least on controlling one or more isolation primitives. For example, in one or more embodiments, the trusted hypervisor prevents the host OS from accessing device memory assigned to the VM based at least on controlling an input-output memory management unit (IOMMU) and/or second-level address translation (SLAT) used to access the data. Further, the trusted hypervisor may enforce code integrity, for example, using hardware virtualization primitives. While examples are primarily provided in the context of gaming, embodiments of the disclosure are more generally relevant to application usage, which may include gaming, performance testing, video conferencing, distributed computer-aided design (CAD), and/or other application types.

The systems and methods described herein may be used for a variety of purposes, by way of example and without limitation, these purposes may include systems or applications for online multiplayer gaming, in-cabin or infotainment applications for vehicle applications (e.g., in-vehicle caming), synthetic data generation, model training, perception, augmented reality, virtual reality, mixed reality, robotics, security and surveillance, autonomous or semi-autonomous machine applications, deep learning, environment simulation, immersive or virtual world applications, data center processing, conversational AI, light transport simulation (e.g., ray tracing, path tracing, etc.), collaborative content creation for 3D assets (e.g., Omniverse by NVIDIA Corporation), digital twin systems, cloud computing and/or any other suitable applications.

Disclosed embodiments may be comprised in a variety of different systems such as systems for participating on online gaming, automotive systems (e.g., an infotainment system such as an in-vehicle infotainment (IVI) system), systems implemented using a robot, aerial systems, medial systems, boating systems, smart area monitoring systems, systems for performing deep learning operations, systems for performing simulation operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for generating or maintaining digital twin representations of physical objects, systems implemented at least partially using cloud computing resources, and/or other types of systems.

FIG. 1 depicts an example of a trust verification system 100 (also referred to herein as "system 100"), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The system 100 may be implemented using, among additional or alternative components, one or more CPUs, such a CPU(s) 102, one or more GPUs, such as a GPU(s) 104, one or more networks, such as a network(s) 106, one or more peripheral devices, such as an input device(s) 108, and/or one or more displays, such as a display(s) 110. The CPU(s) 102 may run (e.g., execute) one or more host OSs, such as a Host OS(s) 114, one or more virtual machines, such as a virtual machine(s) 116, and one or more hypervisors, such as a hypervisor(s) 118. The GPU(s) 104 may run trusted software, such as trusted software 120 and manage GPU state data, such as GPU state data 130 and GPU state data 132.

As an overview, an attestation manager(s) 140 (e.g., running on the VM 116) may receive one or more attestation reports from the CPU 102 and the GPU 104. For example, the CPU 102 may generate at least one attestation report and provide the attestation report(s) to the attestation manager 140 (e.g., using the hypervisor 118). Further, the GPU 104 may generate at least one attestation report and provide the attestation report(s) to the attestation manager 140 (e.g., using the hypervisor 118 and the trusted software 120). The attestation manager(s) 140 may provide data, using the network(s) 106, corresponding to the one or more attestation reports to an attestation service(s) 112. The attestation service 112 may verify the data indicates one or more properties of a TCB 150. For example, the attestation service 112 may verify the data indicates the TCB 150 is to include the VM 116 and the GPU state data 130 (that the VM 116 may use to perform one or more operations). The attestation service 112 may further verify TCB 150 is to isolate the VM 116 and the GPU state data 130 from the host OS 114. For example, the attestation service 112 may verify the TCB is to further include the hypervisor 118 to facilitate at least some of the isolation. The attestation service 112 may provide data, using the network(s) 106, indicating the TCB 150 has been verified. The data may cause the VM 116 and/or one or more applications or services external to the VM 116 to perform one or more operations. For example, the data may enable the VM 116 to use the GPU state data 130 to participate in an application session, such as an online multiplayer gaming session, or otherwise impact operations of the VM 116 and/or one or more applications or services external to the VM 116 (e.g., a game server).

Components of the system 100 may communicate over the network(s) 106. The network(s) 106 may include a wide area network (WAN) (e.g., the Internet, a public switched telephone network (PSTN), etc.), a local area network (LAN) (e.g., Wi-Fi, ZigBee, Z-Wave, Bluetooth, Bluetooth Low Energy (BLE), Ethernet, etc.), a low-power wide-area network (LPWAN) (e.g., LoRaWAN, Sigfox, etc.), a global navigation satellite system (GNSS) network (e.g., the Global Positioning System (GPS)), and/or another network type. In any example, each of the components of the system 100 may communicate with one or more of the other components via one or more of the network(s) 106.

The CPU(s) 102 and the GPU(s) 104 may be implemented on one or more host systems, such as one or more host devices. Examples of a host system include one or more of a personal computer (PC), a smart phone, a laptop computer, a tablet computer, a desktop computer, a wearable device, a smart watch, a mobile device, a touch-screen device, a game console, a virtual (or augmented or mixed) reality system (e.g., a headset, a computer, a game console, remote(s), controller(s), and/or other components), a streaming device, (e.g., an NVIDIA SHIELD), a smart-home device that may include an intelligent personal assistant, a server, a data center, a Personal Digital Assistant (PDA), an MP3 player, a virtual reality headset, a Global Positioning System (GPS) or device, a video player, a video camera, a surveillance device or system, a vehicle, a boat, a flying vessel, a drone, a robot, a handheld communications device, a hospital device, a gaming device or system, an entertainment system, a vehicle computer system, an embedded system controller, a remote control, an appliance, a consumer electronic device, a "smart" conversational kiosk, a workstation, an edge device, any combination of these delineated devices, or any other suitable device. In at least one embodiment, the CPU 102 and the GPU 104 may be included in one or more of the client device(s) 704 of FIG. 7 or the application server(s) 702 of FIG. 7. In at least one embodiment, the CPU 102 and/or the GPU 104 may be included in the data center 900 of FIG. 9.

As shown in FIG. 1, the attestation manager 140 may be included in the VM(s) 116. As further examples, the attestation manager 140 may be included, at least in part, in one or more other VMs, software components, and/or devices, such as a different VM or trusted software or other component (e.g., in the trusted software 120 and/or other trusted software). To allow for policy enforcement and/or remote verification, the VM(s) 116 and/or other components of the system 100 may use, by way of example and not limitation, one or more of system guard runtime monitor (SGRM), secure boot, virtualization-based security (VBS), dynamic root of trust for measurement (DRTM), or device guard.

The attestation service 112 may be implemented in the same, similar, or different systems than the CPU(s) 102 and the GPU(s) 104. While the attestation service 112 is shown as communicating to the VM 116 over the network 106, in at least one embodiment, the attestation service 112 may be implemented in one or more host systems or devices that include the CPU(s) 102 and the GPU(s) 104. Thus, while the attestation service 112 is shown in FIG. 1 as communicating with the VM 116 and/or the attestation manager 140 over the network(s) 106, in at least one embodiment, different communication media and/or interfaces may be used. In at least one embodiment, the attestation service 112 is included in one or more servers. For example, the attestation service 112 may be included in the application server(s) 702 of FIG. 7, one or more game servers, and/or one or more different servers.

As described herein, the VM 116 may use the GPU state data 130 to perform one or more operations. For example, the VM 116 may communicate with the GPU 104 over one or more communication channels 160 to perform one or more operations. GPU state data may refer to data representing one or more variables, conditions, parameters, resources, device code, and/or other data used to perform one or more tasks using the GPU(s) 104, such as one or more parallel processing tasks. Examples of the parallel processing tasks include tasks to implement one or more portions of the one or more operations, such as one or more operations for gaming, machine control, machine locomotion, machine driving, synthetic data generation, model training, perception, augmented reality, virtual reality, mixed reality, robotics, security and surveillance, autonomous or semi-autonomous machine applications, deep learning, environment simulation, data center processing, conversational AI, light transport simulation (e.g., ray tracing, path tracing, etc.), collaborative content creation for 3D assets, digital twin systems, cloud computing and/or any other suitable applications.

Examples of the resources include objects such as modules and texture or surface references. A module may refer to a dynamically loadable package of device code and/or data. Device code symbols may include functions, global variables, and/or texture, surface, and/or resource references. In at least one embodiment, each set of GPU state data may have its own distinct address space, and values from the set of GPU state data may reference corresponding memory locations. In one or more embodiments, a set of GPU state data, such as the GPU state data 130, may include a GPU context, such as a compute unified device architecture (CUDA) context.

In one or more embodiment, the one or more operations may be performed, at least in part, using one or more applications running on the VM 116. The application(s) may include, for example, an application(s) 216B of FIG. 2. The application 216B may include a game, a video streaming application, a machine control application, a machine locomotion application, a machine driving application, a synthetic data generation application, a model training application, a perception application, an augmented reality application, a virtual reality application, a mixed reality application, a robotics application, a security and surveillance application, an autonomous or semi-autonomous machine application, a deep learning application, an environment simulation application, a data center processing application, a conversational AI application, a light transport simulation application (e.g., ray tracing, path tracing, etc.), a collaborative content creation application for 3D assets, a digital twin system application, a cloud computing application and/or another type of application or service.

The application 216B may include a mobile application, a computer application, a console application, a tablet application, and/or another type of application. The application 216B may include instructions that, when executed by a processor(s) (e.g., the CPU 102 and/or the GPU 104), cause the processor(s) to, without limitation, configure, modify, update, transmit, process, and/or operate on the GPU state data 130, receive input data representative of user inputs to the one or more input device(s) (e.g., corresponding to the input device 108), transmit at least some of the input data to a server(s) (e.g., an application server 702 and/or a game server), retrieve at least a portion of application data from memory, receive at least a portion of application data from the server(s), and/or cause display or presentation of data (e.g., image and/or video data) corresponding to the GPU state data 130 on the display 110. In one or more embodiments, the application(s) 216B may operate as a facilitator for enabling interacting with and viewing output from an application instance hosted on an application server using a client device(s).

In one or more embodiments, the VM 116 and/or application 216B receives display data (e.g., encoded display data, as described with respect to FIG. 7), and uses the GPU state data 130 to decode, render, and/or display image frames corresponding to the application instance on the display(s) 110. In some examples, a first client device may render image frames while a second client device, may receive the display data and display the image frames using the display data. In examples where the display data is received by the VM 116 (e.g., where the CPU 102 and the GPU 104 do not generate the rendering), the system 100 may be part of a game or content streaming system, such as the game streaming system 700 of FIG. 7, described herein. The VM 116 and/or the application 216B may facilitate a plurality of game or application sessions over time. The application sessions may include any number of application sessions participated in by any number of users for any number of different applications.

The display(s) 110 may include any type of display capable of displaying image data (e.g., a light-emitting diode display (LED), an organic LED display (OLED), a liquid crystal display (LCD), an active matrix OLED display (AMOLED), a quantum dot display (QDD), a plasma display, an LED/LCD display, and/or another type of display). In some examples, the display(s) 110 may include more than one display (e.g., a dual-monitor display for computer gaming, a first display for configuring a game and a virtual, augmented, or mixed reality display for playing the game, etc.). In some examples, the display 110 includes a touch-screen display, such as a touch-screen of a smart phone, tablet computer, laptop computer, or the like, where the touch-screen corresponds to at least one of the input devices 108.

Figure 7:
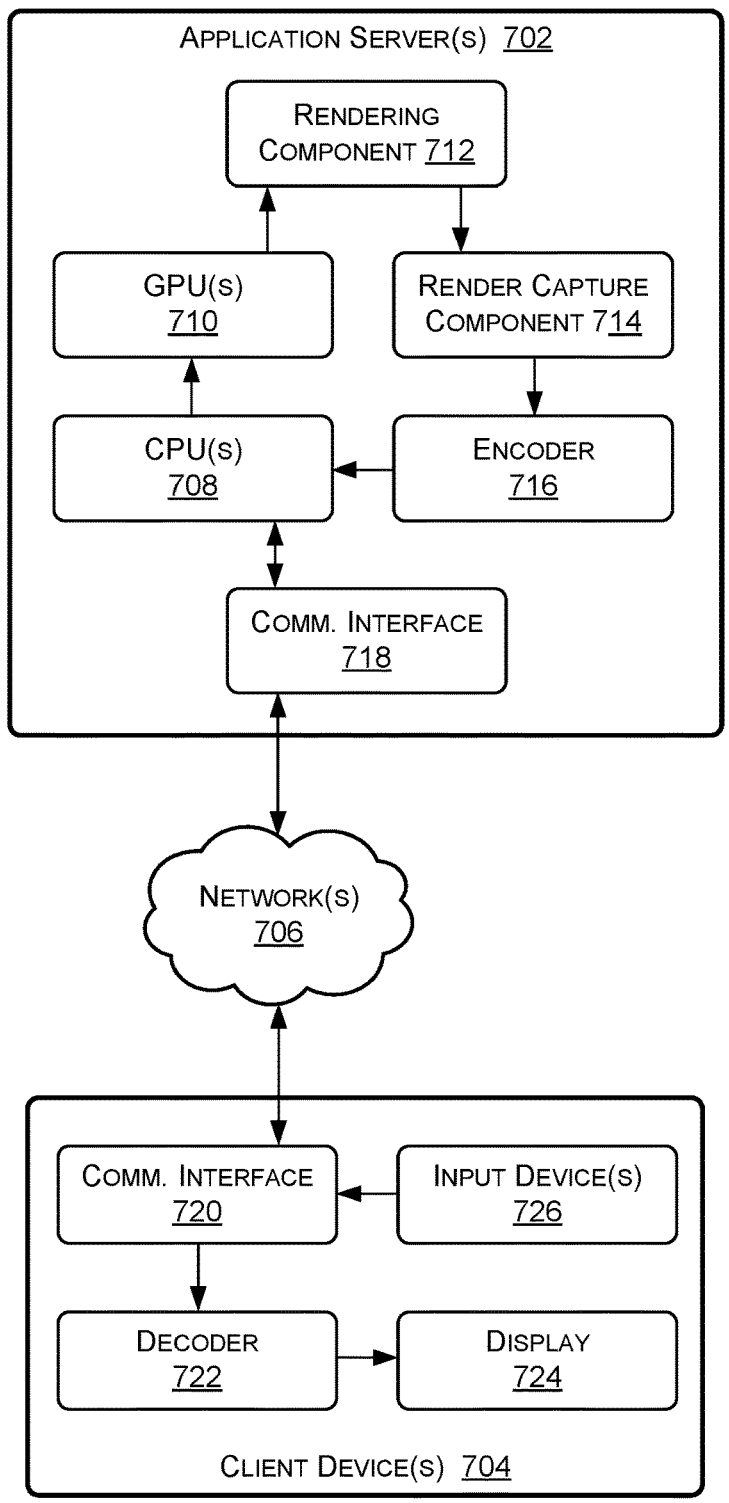
FIG. 7 is a block diagram of an example content streaming system suitable for use in implementing some embodiments of the present disclosure.

The input device(s) 108 may include any type of input device that is capable of providing user inputs to the VM(s) 116, the host OS(s) 114, and/or the application(s) 216B (e.g., the input device(s) 726 of FIG. 7). The input device(s) 108 may include one or more of a keyboard, a mouse, a microphone(s), a touch-screen display, a controller(s), a remote(s), a headset (e.g., sensors of a virtual reality headset), and/or other types of input devices. In one or more embodiments, the user inputs may be used to control one or more application instances running locally on the VM(s) 116 or other component of the one or more host systems and/or remotely on an application and/or game server, such as the application server(s) 702 of FIG. 7. In one or more embodiments, the VM(s) 116 may include a game and/or video streaming application, and/or another type of application or service. For example, where an application instance is running remotely, the VM(s) 116 may receive streaming video data corresponding to output frames from an application instance running on a server, present the video data using the display 110 and the GPU state data 130, and stream the user input data to the server to control the application instance.

As described herein, the attestation service 112 may verify the data indicates one or more properties of the TCB 150. For example, the attestation service 112 may track valid software and/or hardware configurations for the TCB 150 that include the one or more properties. By verifying the properties of the TCB 150, the VM 116, the application 216B, an application server, and/or other devices, components, or entities may determine whether the TCB 150 is to operate in accordance with security policies and/or enforce those security policies. For example, one or more entities may determine the VM 116 is operating in environment that is architecturally isolated from one or more cheat vectors for gaming or otherwise one or more attack vectors for application usage. Thus, in at least one embodiment, the attestation service 112 is used to reduce the impact and/or frequency of cheating in gaming, even where the host OS(s) 114 corresponds to an open system, for example, on a PC.

For example, the TCB 150 may be verified to enable the VM 116 to use the GPU state data 130 to participate in an application session, such as an online multiplayer gaming session, or otherwise impact operations of the VM 116 and/or one or more applications or services external to the VM 116 (e.g., a game server). In one or more embodiments, the system 100 may be integrated into a multiplayer gaming architecture in which multiple users (e.g., players) connect to a game service that hosts game sessions over the internet. In one or more embodiments, the game service may use the attestation service 112 to determine whether to admit a user into a game based at least on one or more properties of the TCB(s) indicated by attestation report(s). For example, the game service may determine whether to: allow a user to connect to the game service, enter a specific game session, enter a type of game session, etc.

The action(s) taken by the game service based on results of the attestation service 112 analyzing the data indicating the properties of the TCB(s) may be defined by policy information, which may be configured by a game service operator (e.g., a user having an authorized user group type). In at least one embodiment, the policies may define one or more minimum hardware and/or software requirements for admission to the game. If software or hardware that gives an unfair advantage to a player is detected on the system 100 using the attestation service 112, the game service may prevent the user from joining or continuing to use game service. While connected to the game service, the system 100 may provide one or more attestation reports to the attestation service 112 for verification when requested. When connected to the game service, the user may still be able to use the system 100 for other purposes (e.g., outside of the TCB 150) simultaneously with using the application(s) 216B on the game service. For example, in at least one embodiment, the host OS 114 and/or another VM or service outside of the TCB 150 may operate using GPU state data 132 that is outside of the TCB 150. By way of example, and not limitation, the host OS 114 may use the GPU state data 132 to render one or more portions of a host OS desktop, to render graphical content of one or more applications running on the host OS 114, or to otherwise perform one or more options using the GPU 104. The game service and/or attestation service 112 may detect spoofing of and/or tampering associated with attestation reports and act against entities and/or systems associated with the spoofing (e.g., by issuing and enforcing bans). In one or more embodiments, the game service may authenticate a user prior to accepting and/or acting in association with data corresponding to one or more attestation reports from the user.

Thus, results of the attestation service 112 analyzing the data corresponding to the attestation report(s) may be used by an application service (e.g., a game service) to enable the VM 116 and/or the application 216B to perform one or more operations, such as participating in an application session, connecting to an application server and/or service, operating using the GPU state data 130, etc. Additionally, or alternatively, the results may be used to verify the authenticity of data generated based at least on execution of the application(s) 216B and/or VM(s) 116, such as results, output data, recordings (e.g., game session recordings, highlights, etc.), and/or other content generated using the TCB 150 (e.g., to authenticate gameplay to verify a speed run, verify achievements, authenticate or verify neural network output data, etc.). Disclosed approaches may be used to, for example, guarantee that pixels (e.g., for the display 110) or other data generated using the system 100 were not altered or generated by untrusted hardware and/or software.

As indicated herein, disclosed approaches are not limited to server-based implementations. For example, the VM(s) 116 and/or the application(s) 216B may perform one or more actions and/or operations based at least on the results without requiring a corresponding determination at a server.

As described herein, the verified properties for the TCB 150 may include that the TCB 150 is to include the GPU state data 130 and the VM 116 and that the TCB 150 is to isolate the GPU state data 130 and the VM 116 from the host OS 114, which is untrusted. In doing so, the VM 116 may operate in a trusted environment using trusted code that is protected from most known significant attack vectors related to the host OS 114 while using the GPU state data 130. Thus, the VM 116 may benefit from GPU acceleration and/or other functionality of the GPU 104, while being protected from the host OS 114. For example, the host OS 114 may be operating in an open system or may otherwise be vulnerable to execution of unauthorized or untrusted code, such as cheat software, whether or not the untrusted code is installed and/or run intentionally by a user of the host OS 114. However, the TCB 150 may ensure the integrity of the VM 116 and associated data generated using the GPU 104 by preventing the host OS 114 from accessing memory and one or more communications channels used by the VM 116 to perform computing operations using the GPU state data 130.

As described herein, aspects of the disclosure provide approaches for a TCB to architecturally isolate the VM 116 and the GPU state data 130 from the host OS 114 based at least on including the hypervisor 118 within the TCB 150 (e.g., regardless of features related to attestation reports and/or verification of properties of the TCB 150). Thus, in one or more embodiments, the attestation service 112 may verify the TCB 150 includes the hypervisor 118 to isolate the VM 116 and the GPU state data 130 from the host OS 114.

Figure 2:
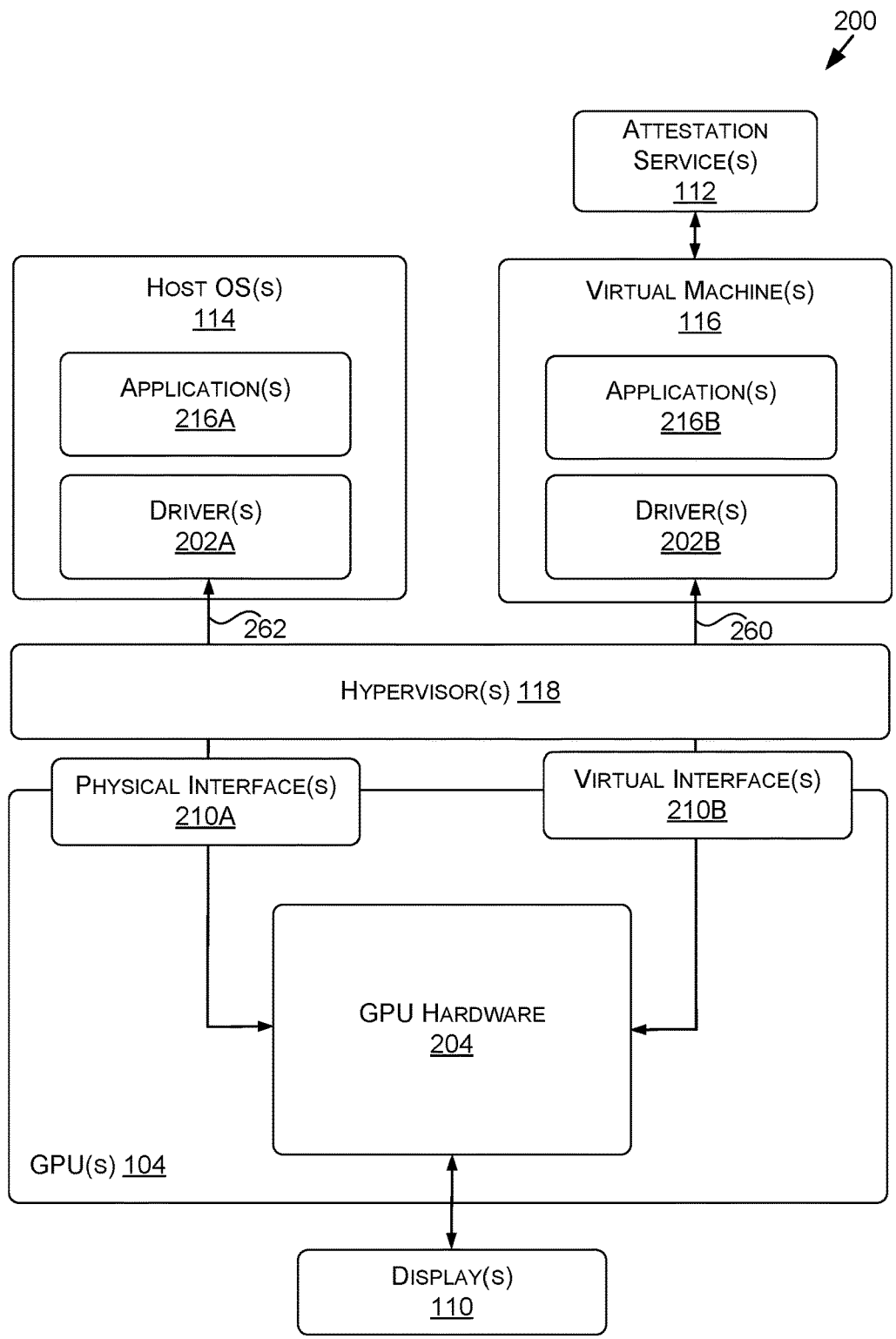
FIG. 2 illustrates an example of an architecture that may enable an untrusted host OS and a virtual machine to use corresponding GPU state data within a GPU, in accordance with some embodiments of the present disclosure.

Referring now to FIG. 2, FIG. 2 shows an example of an architecture 200 that may enable the host OS 114 and the VM 116 to use corresponding GPU state data within the GPU 104, in accordance with some embodiments of the present disclosure. As indicated in FIG. 2, the hypervisor 118 and/or other trusted software (and/or hardware) within the TCB 150 may be configured to assign and/or manage interfaces between the host OS(s) 114, the VM(s) 116, and/or GPU hardware 204 to provide isolation between the various components. For example, the interfaces may include one or more physical interfaces 210A and one or more virtual interfaces 210B to communicate with the GPU hardware 204. Thus, the host OS 114 may have ownership of the GPU 104. In the example shown, the hypervisor 118 isolates the physical interface 210A used by the host OS 114 from the virtual interface 210B used by the VM 116. In at least one embodiment, the host OS 114 may use one or more virtual interfaces that are outside of the TCB 150.

As indicated in FIG. 2, the physical interface(s) 210A may provide one or more communication channels 262 for communication between the host OS 114 and other components, such as the GPU hardware 204. Similarly, the virtual interface(s) 210B may provide one or more communication channels 260 for communication between the VM(s) 116 and other components, such as the GPU hardware 204. In at least one embodiment, the communication channel(s) 260 may comprise at least part of the communication channel(s) 160 of FIG. 1. Also in at least one embodiment, the physical interface(s) 210A and the virtual interface(s) 210B (also referred to as interfaces 210) may include one or more network interfaces, such as peripheral component interconnect express (PCIe) interfaces. By way of example, and not limitation, the physical interface(s) 210A may include one or more physical functions and the virtual interface(s) 210B may include one or more virtual functions. In at least one embodiment, the hypervisor 118 may isolate one or more of the interfaces 210 using single root I/O virtualization (SR-IOV) and/or another virtualization technology. In one or more embodiments, each interface 210 may be assigned a unique requester identifier (RID) that allows a memory management unit (MMU), such as an IOMMU of FIG. 3, to differentiate between different traffic streams and apply memory and interrupt translations between the interfaces 210. This may allow traffic streams to be delivered directly to the appropriate partition. As such, graphics hardware may be shared in a manner that allows for responsiveness and low latency among multiple tenants.

FIG. 2 also shows an example where the host OS(s) 114 uses a driver(s) 202A to communicate with the GPU hardware 204 and the VM(s) 116 uses a driver(s) 202B to communicate with the GPU hardware 204. The driver 202A and the driver 202B (also referred to as drivers 202) may include one or more user mode drivers and/or one or more kernel mode drivers. FIG. 2 also shows an example where the host OS(s) 114 includes an application(s) 216A and the VM 116 includes the application(s) 216B (also referred to as applications 216). The application 216A may be similar to or different than the application 216B. In at least one embodiment, an application(s) 216 may present graphics to a graphics Application Programming Interface (API), such as OpenGL or DirectX, which may be implemented using a user mode driver 202. The user mode driver 202 may communicate the graphics through a kernel mode driver 202, which may present the graphics using an interface(s) 210 for display using the display(s) 110.

In at least one embodiment, the application 216B (e.g., a game) runs as an application instance in the VM 116. In one or more embodiments, the host OS 114 may include a window manager used to control the placement and/or appearance of windows. For example, the host OS 114 may launch the VM 116, causing the hypervisor 118 to assign a virtual interface 210B to the VM 116 and/or causing the application 216B to be run and presented (e.g., responsive to launching the VM 116) in a windowed or full screen mode. In at least one embodiment, the VM 116 may be launched (e.g., using an application 216A) responsive to one or more user inputs to an input device 108. In at least one embodiment, the VM 116 may comprise a trimmed down and/or lightweight operating environment, such as Windows Sandbox. In at least one embodiment, the operating environment may load each time in a same state. For example, data may not persist between launches of the VM 116 and the VM 116 may be loaded from immutable state data. In one or more embodiments, the VM 116 may correspond to immutable and mutable state data. For example, virtualization components may correspond to immutable state data. Mutable state data for the VM 116 may include save files, temporary files, etc. The operating environment may use hardware-based virtualization for kernel isolation with an integrated kernel scheduler and memory manager.

In at least one embodiment, the GPU hardware 204 may perform final compositing of frames for display using the display(s) 110. For example, where display data from the VM 116 is included (e.g., in a window) in a frame for output to the display 110 along with content from one or more other VMs and/or the host OS, the GPU hardware 204 may perform final compositing of the frame to maintain isolation of display data from the host OS and/or other VMs.

Figure 3:
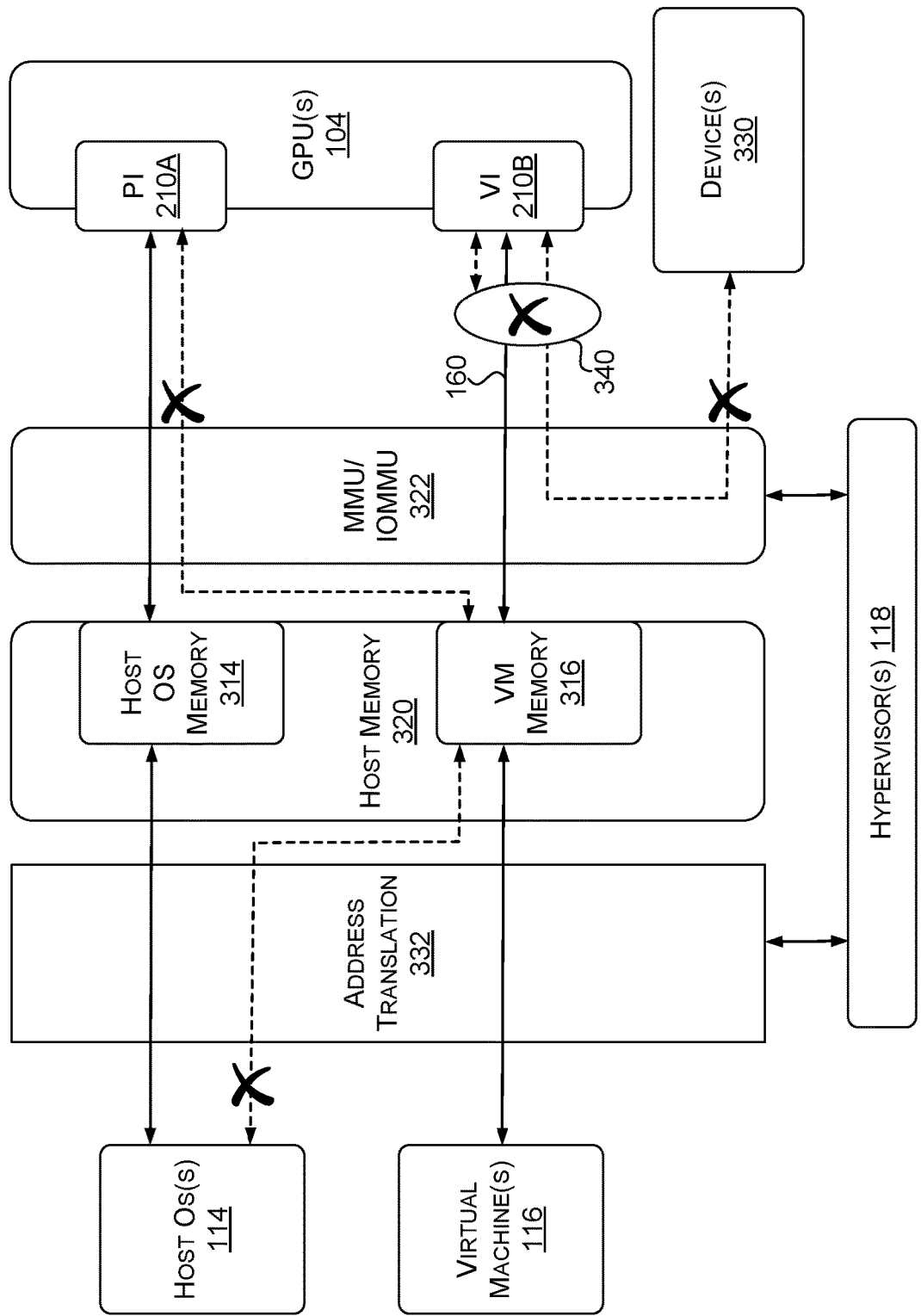
FIG. 3 illustrates an example of a hypervisor controlling a memory management unit and address translation to isolate GPU state data and a VM from untrusted entities, in accordance with some embodiments of the present disclosure.

As described herein, the one or more verified properties of the TCB 150 may include the hypervisor 118 and/or other trusted components isolating the VM 116 and the GPU state data 130 from the host OS 114 based at least on controlling one or more isolation primitives. Referring now to FIG. 3, FIG. 3 illustrates an example of the hypervisor 118 controlling the MMU/IOMMU 322 and address translation 332 to isolate the GPU state data 130 and the VM 116 from untrusted entities, in accordance with some embodiments of the present disclosure. For example, the hypervisor 118 may prevent the host OS 114 from accessing VM memory 316 assigned to the VM 116 in host memory 320 based at least on controlling the MMU/IOMMU 322 and/or the address translation 332 (e.g., second-level address translation (SLAT)) used to access the VM memory 316. FIG. 3 uses dashed lines to indicate various attack vectors which may be blocked using the hypervisor 118. As shown in FIG. 3, the hypervisor 118 may protect the VM memory 316 from one or more devices 330, such as devices external to the host device and/or peripheral devices, examples of which may include the input device(s) 108 and/or the display(s) 110.

In at least one embodiment, the host OS 114 uses the hypervisor 118 to assign the VM memory 316 to the VM 116 (e.g., when the VM 116 is launched). While the VM 116 is running, the hypervisor 118 and/or the GPU 104 may prevent the host OS 114 from accessing the VM memory 316 assigned to the VM 116.

In at least one embodiment, the hypervisor 118 may be incapable of or ineffective at blocking an attack vector 340. For example, at least a portion of the communication channel(s) 260 may be vulnerable to interposer attacks, for example, when the interface(s) 210 is connected to an exposed bus (e.g., external to a chip package(s) of the host device(s)). An exposed bus may be used, for example, where the GPU(s) 104 includes a discrete GPU (e.g., for CPU-GPU communication). In one or more embodiments, to ameliorate the attack vector 340 and/or other attack vectors, at least one of the communication channels 160, 260, 262 and/or other communication channels may be encrypted. Further, the one or more verified properties of the TCB 150 may be that the communication channel(s) are encrypted and/or that non-encrypted/authenticated data is to be blocked. In at least one embodiment, the VM 116 (e.g., the driver 202B) may establish one or more secure communication channels, such as the communication channel(s) 160 using the virtual interface(s) 210B. This process may include, for example, a handshake and/or initialization of the GPU state data 130 and/or the GPU hardware 204. In at least one embodiment, one or more of the secure channels may be used by the VM 116 to receive one or more attestation reports from the GPU(s) 104.

The encryption may be implemented using hardware accelerated encryption, hardware native encryption, and/or software encryption. In at least one embodiment, the VM 116 and the GPU 104 are to encrypt all network traffic sent to the virtual interface(s) 210B. In at least one embodiment, application state and related command and configuration data is encrypted on all buses external to the chip package(s). Additionally, or alternatively, data may be verified (e.g., using the hypervisor 118) for integrity after exposure to any bus external to a chip package(s). In at least one embodiment, the one or more verified properties of the TCB 150 may include any combination of these properties.

Various functionality described herein as being performed using the hypervisor 118 may be performed using additional and/or different trusted components, such as trusted hardware and/or software of the TCB 150. In one or more embodiments, the trusted components may include secure encrypted virtualization (SEV) and/or trusted domain extension (TDX) components. In at least one embodiment, the hypervisor 118 is outside of the TCB 150 and may be untrusted in the system 100. However, including the hypervisor 118 in the TCB 150 may provide corresponding properties to the TCB 150 even where the CPU(s) 102 lacks certain protection technology, such as SEV or TDX. Further, the hypervisor 118 may facilitate isolation unavailable to SEV and TDX, such as preventing injection of user input from the host OS(s) 114, modification of display output by the host OS(s) 114, etc.

Other examples of the one or more verified properties of the TCB 150 include that software that can read and/or write application state data of the CPU(s) 102 and/or the GPU(s) 104 is attested to, that devices that have access to the application state data are authorized, that display scanout is to occur at an authorized endpoint(s), that display scanout is to occur from authorized memory, that particular and/or approved software is included in the TCB 150, that an authorized overlay(s) is displayed over representations of application display data in frames, that software that is part of the application TCB is revocable, and/or that the input device(s) 108 is authorized prior to inputs being accepted within the TCB 150.

In at least one embodiment, the one or more verified properties of the TCB 150 may correspond to software to detect misuse of the application(s) 216B and/or an application instance(s), such as anti-cheat software. The software may attempt to detect particular cheats or behavior and take a remedial action when a cheat is detected. As the software is included in the TCB 150 and captured in the attestation report(s), circumventing or bypassing detection may be significantly more difficult. In at least one embodiment, the software may be to detect frame modification and/or non-human or modified user input.

As described herein, the VM 116 may receive at least one attestation report from the CPU(s) 102. For example, the VM 116 may receive at least one attestation report from a trusted component(s) of the CPU(s) 102, such as the hypervisor 118. The at least one attestation report from the CPU(s) 102 may be generated, at least in part, by the CPU(s) 102. For example, the at least one attestation report may be generated at least in part, by a trusted component(s) of the CPU(s) 102, such as the hypervisor 118. In at least one embodiment, the at least one attestation report is generated and provided using at least one chain of trust rooted in the CPU(s) 102 (a hardware root of trust).

Similarly, the VM 116 may receive one or more attestation reports from the GPU(s) 104 (e.g., over a communication channel 160). For example, the VM 116 may receive at least one attestation report from a trusted component(s) of the GPU(s) 104, such as the trusted software 120. The at least one attestation report from the GPU(s) 104 may be generated, at least in part, by the GPU(s) 104. For example, the at least one attestation report may be generated at least in part, by a trusted component(s) of the GPU(s) 104, such as the trusted software 120. In at least one embodiment, the at least one attestation report is generated and provided using at least one chain of trust rooted in the GPU(s) 104 (a hardware root of trust separate from the hardware root of trust of the CPU(s) 102).

Measurements captured using an attestation report(s) may correspond to code, data, hardware and/or software state and/or configurations, fuse settings, device modes, version information, and/or orderings (e.g., of loading, launching, and/or booting one or more elements for the TCB 150). In one or more embodiments, the attestation report(s) provided to the attestation manager 140 and/or used by the attestation service(s) 112 to verify the TCB 150 may capture measurements of all software that is running in and/or is to be run in the TCB 150 (e.g., during an application session). The software may include firmware and/or microcode on any device used to implement the TCB 150. Software configurations that can impact the completeness or accuracy of the measurements may be captured in the attestation report(s) (e.g., tested mode, secure boot state). Further, hardware configurations for all devices that can impact application state may be captured in the attestation report(s).

Measurements used to generate an attestation report(s) may be generated in a deterministic manner. In one or more embodiments, attestation may include a measured boot of the hypervisor 118 to the exclusion of the host OS(s) 114, a measured boot of the VM(s) 116, and a measured boot of the GPU(s) 104. A measured boot may store measurements of boot components and attestation to the validity of measurements by an attestor (e.g., the attestation service(s) 112). In one or more embodiments, a secure or trusted boot may be used which may include authentication of components via cryptographic verification.

Figure 4:
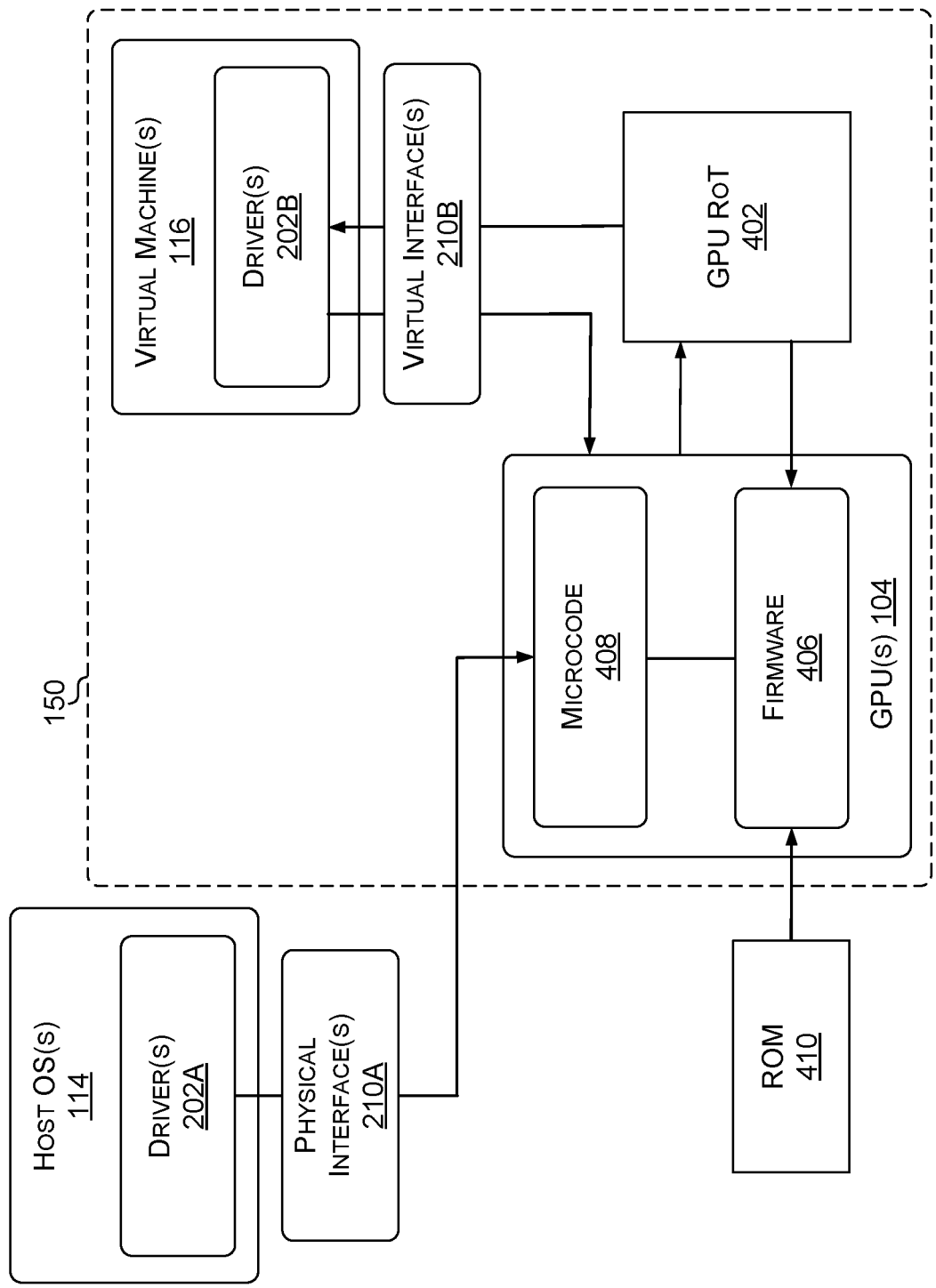
FIG. 4 illustrates an example of using a GPU root of trust for attestation, in accordance with some embodiments of the present disclosure.

Referring now to FIG. 4, FIG. 4 illustrates an example of using a GPU root of trust 402 for attestation, in accordance with some embodiments of the present disclosure. In at least one embodiment, the GPU 104 uses a measured and attested boot to load firmware 406 and microcode 408. The firmware 406 may be loaded from read-only memory (ROM) 410 and the microcode 408 may be loaded from the host OS(s) 114. The microcode 408 may be relied upon to enforce isolation of GPU resources used by the VM 116. Thus, the GPU 104 may use the root of trust (RoT) 402 to verify the firmware 406, the microcode 408, and/or other data is trustworthy. For example, the RoT 402 may be used to authenticate and measure the firmware 406 and the microcode 408 for generation of an attestation report(s) provided to the attestation manager 140. In at least one embodiment, the GPU 104 may generate the attestation report(s) using a secure boot. In the secure boot, all code to be run may be authenticated and measured. The GPU 104 may use a session key exchange that uses, for example, a security protocol and data model (SPDM) to retrieve the firmware 406 and/or the microcode 408.

Figure 5:
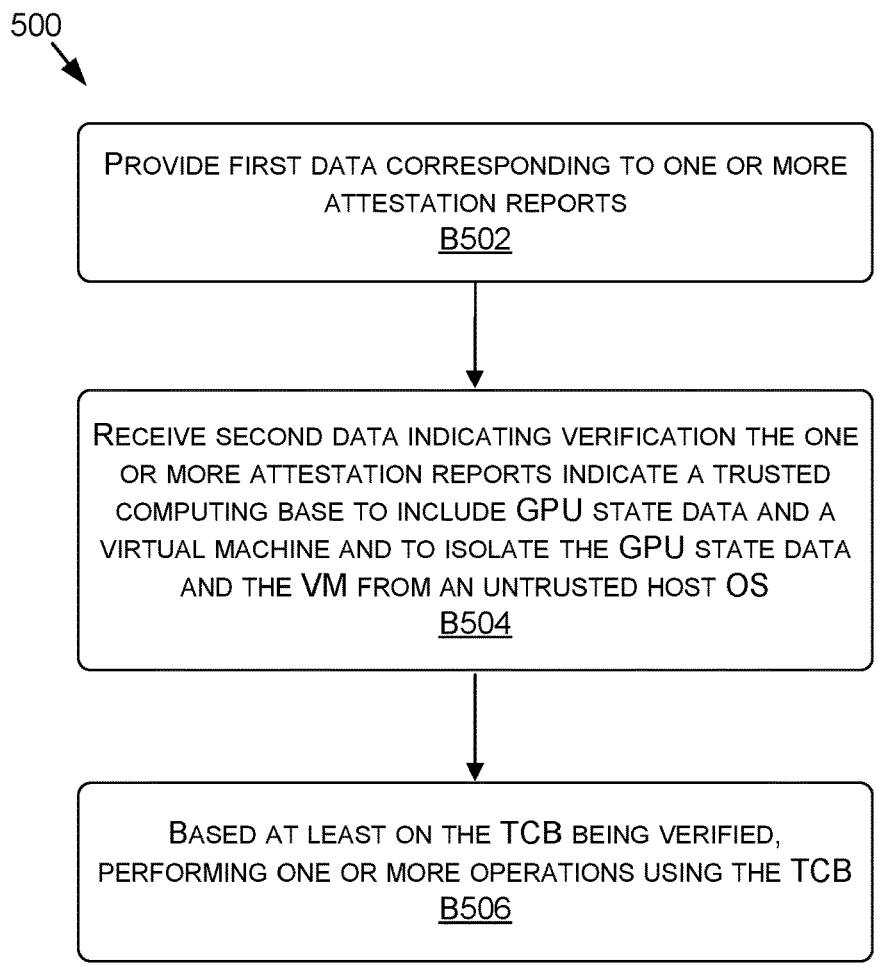
FIG. 5 is a flow diagram showing a method a virtual machine may use to operate using a trusted computing base, in accordance with some embodiments of the present disclosure.
Figure 6:
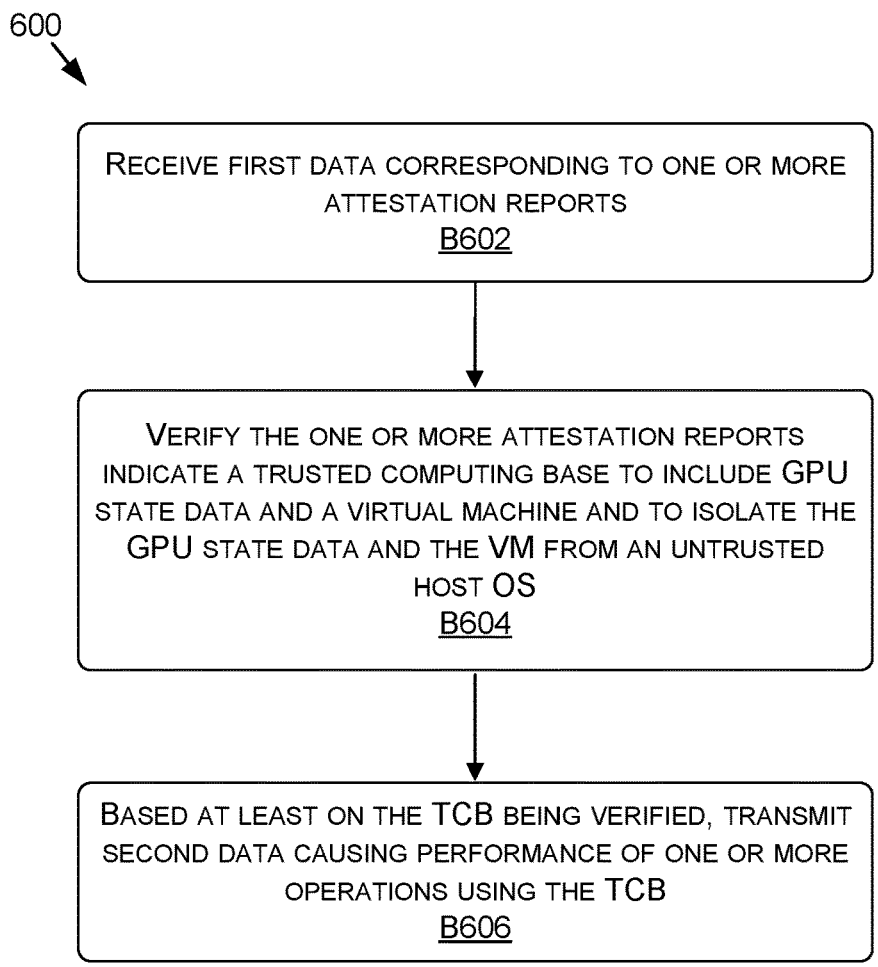
FIG. 6 is a flow diagram showing a method an attestation service may use to facilitate performing operations using a trusted computing base, in accordance with some embodiments of the present disclosure.

Now referring to FIGS. 5-6, each block of method 500, and 600, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods are described, by way of example, with respect to particular figures. However, the methods may additionally or alternatively be executed by any one system, or any combination of systems, including, but not limited to, those described herein.

FIG. 5 is a flow diagram showing a method 500 a virtual machine may use to operate using a trusted computing base, in accordance with some embodiments of the present disclosure. The method 500, at block B502, includes providing first data corresponding to one or more attestation reports. For example, the attestation manager 140 may provide, to the attestation service 112, first data corresponding to one or more attestation reports generated using the GPU(s) 104 the CPU(s) 102 executing the host OS 114.

At block B504, the method 500 includes receiving second data indicating verification the one or more attestation reports indicate a trusted computing base is to include GPU state data and a virtual machine and is to isolate the GPU state data and the VM from the untrusted host OS. For example, the VM(s) 116 may receive second data indicating verification, using the attestation service 112 and the first data, that the one or more attestation reports indicate the TCB 150 is to include the GPU state data 130 within the GPU(s) 104 and the VM(s) 116 that uses the GPU state data 130.

At block B506, the method 500 includes, based at least on the TCB being verified, performing one or more operations using the TCB. For example, based at of the TCB being verified using the first data, the VM(s) 116 and/or other components in the system 100 may perform one or more operations using the TCB 150.

Now referring to FIG. 6, FIG. 6 is a flow diagram showing a method 600 an attestation service may use to facilitate performing operations using a trusted computing base, in accordance with some embodiments of the present disclosure. The method 600, at block B602, includes receiving first data corresponding to one or more attestation reports. For example, the attestation service 112 may receive from the attestation manager 140, first data corresponding to one or more attestation reports generated using the GPU(s) 104 the CPU(s) 102 executing the host OS 114.

At block B604, the method 600 includes verifying the one or more attestation reports indicate a trusted computing base is to include GPU state data and a virtual machine and is to isolate the GPU state data and the VM from the untrusted host OS. For example, the VM(s) 116 may verify, using the first data, that the one or more attestation reports indicate the TCB 150 is to include the GPU state data 130 within the GPU(s) 104 and the VM(s) 116 that uses the GPU state data 130.

At block B606, the method 600 includes, based at least on the TCB being verified, transmitting second data causing performance of one or more operations using the TCB. For example, based at of the TCB being verified using the first data, the attestation service 112 may transmit second data to causing the VM 116 to perform one or more operations using the TCB 150.

Example Content Streaming System

Now referring to FIG. 7, FIG. 7 is an example system diagram for a content streaming system 700, in accordance with some embodiments of the present disclosure. FIG. 7 includes application server(s) 702 (which may include similar components, features, and/or functionality to the example computing device 800 of FIG. 8), client device(s) 704 (which may include similar components, features, and/or functionality to the example computing device 800 of FIG. 8), and network(s) 706 (which may be similar to the network(s) described herein). In some embodiments of the present disclosure, the system 700 may be implemented. The application session may correspond to a game streaming application (e.g., NVIDIA GeForce NOW), a remote desktop application, a simulation application (e.g., autonomous or semi-autonomous vehicle simulation), computer aided design (CAD) applications, virtual reality (VR), augmented reality (AR), and/or mixed reality (MR) streaming applications, deep learning applications, and/or other application types.

In the system 700, for an application session, the client device(s) 704 may only receive input data in response to inputs to the input device(s), transmit the input data to the application server(s) 702, receive encoded display data from the application server(s) 702, and display the display data on the display 724. As such, the more computationally intense computing and processing is offloaded to the application server(s) 702 (e.g., rendering—in particular ray or path tracing—for graphical output of the application session is executed by the GPU(s) of the game server(s) 702). In other words, the application session is streamed to the client device(s) 704 from the application server(s) 702, thereby reducing the requirements of the client device(s) 704 for graphics processing and rendering.

For example, with respect to an instantiation of an application session, a client device 704 may be displaying a frame of the application session on the display 724 based on receiving the display data from the application server(s) 702. The client device 704 may receive an input to one of the input device(s) and generate input data in response. The client device 704 may transmit the input data to the application server(s) 702 via the communication interface 720 and over the network(s) 706 (e.g., the Internet), and the application server(s) 702 may receive the input data via the communication interface 718. The CPU(s) may receive the input data, process the input data, and transmit data to the GPU(s) that causes the GPU(s) to generate a rendering of the application session. For example, the input data may be representative of a movement of a character of the user in a game session of a game application, firing a weapon, reloading, passing a ball, turning a vehicle, etc. The rendering component 712 may render the application session (e.g., representative of the result of the input data) and the render capture component 714 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the application server(s) 702. In some embodiments, one or more virtual machines (VMs)—e.g., including one or more virtual components, such as vGPUs, vCPUs, etc.—may be used by the application server(s) 702 to support the application sessions. The encoder 716 may then encode the display data to generate encoded display data and the encoded display data may be transmitted to the client device 704 over the network(s) 706 via the communication interface 718. The client device 704 may receive the encoded display data via the communication interface 720 and the decoder 722 may decode the encoded display data to generate the display data. The client device 704 may then display the display data via the display 724.

Example Computing Device

Figure 8:
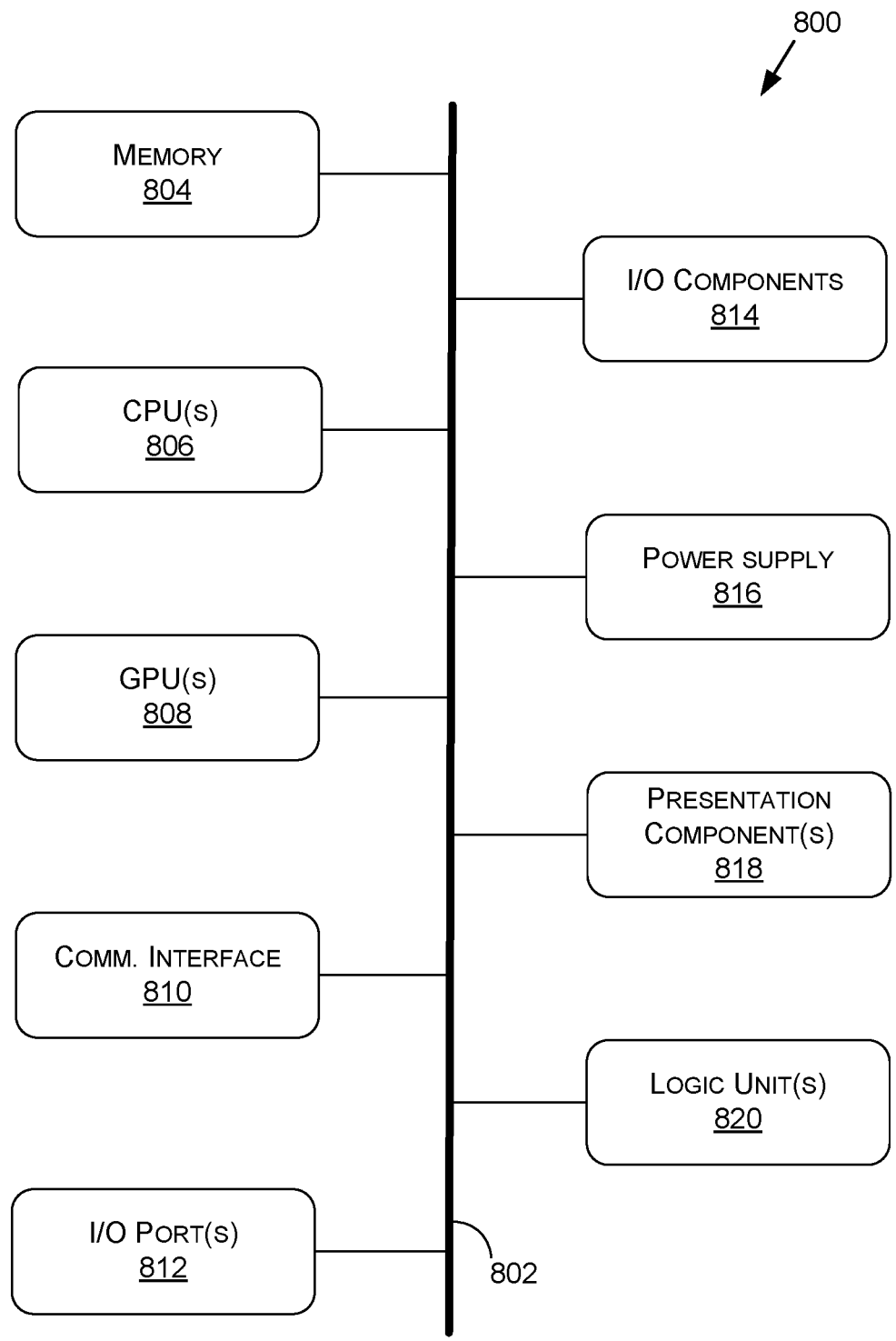
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. In at least one embodiment, the computing device(s) 800 may comprise one or more virtual machines (VMs), and/or any of the components thereof may comprise virtual components (e.g., virtual hardware components). For non-limiting examples, one or more of the GPUs 808 may comprise one or more vGPUs, one or more of the CPUs 806 may comprise one or more vCPUs, and/or one or more of the logic units 820 may comprise one or more virtual logic units. As such, a computing device(s) 800 may include discrete components (e.g., a full GPU dedicated to the computing device 800), virtual components (e.g., a portion of a GPU dedicated to the computing device 800), or a combination thereof.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 820 and/or communication interface 810 may include one or more data processing units (DPUs) to transmit data received over a network and/or through interconnect system 802 directly to (e.g., a memory of) one or more GPU(s) 808.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, DPUs, etc.), and output the data (e.g., as an image, video, sound, etc.).

Example Data Center

Figure 9:
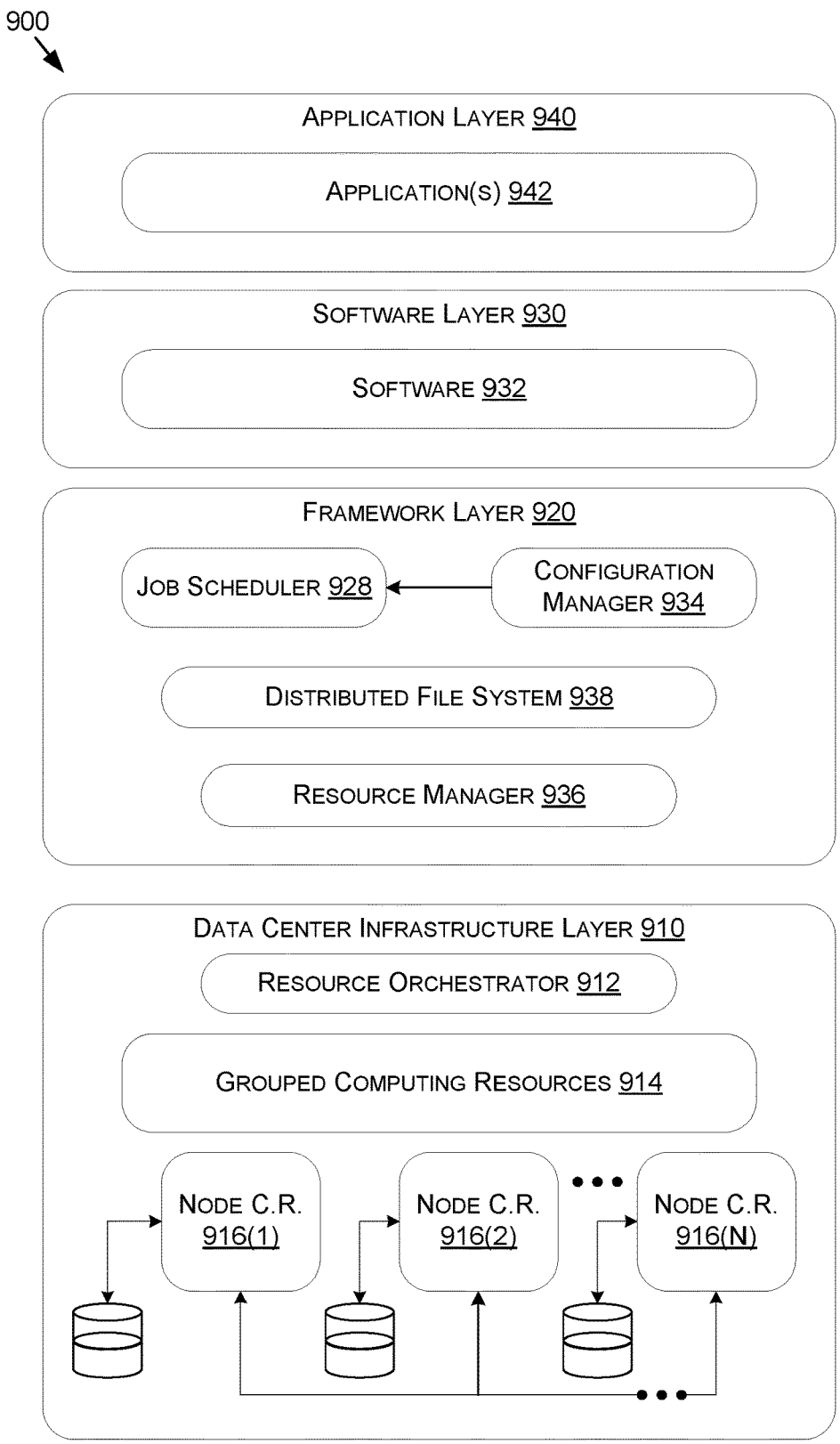
FIG. 9 is a block diagram of an example data center suitable for use in implementing some embodiments of the present disclosure.

FIG. 9 illustrates an example data center 900 that may be used in at least one embodiments of the present disclosure. The data center 900 may include a data center infrastructure layer 910, a framework layer 920, a software layer 930, and/or an application layer 940.

As shown in FIG. 9, the data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 916(1)-916(N) may correspond to a server having one or more of the above-mentioned computing resources. In addition, in some embodiments, the node C.R.s 916(1)-9161(N) may include one or more virtual components, such as vGPUs, vCPUs, and/or the like, and/or one or more of the node C.R.s 916(1)-916(N) may correspond to a virtual machine (VM).

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 912 may configure or otherwise control one or more node C.R.s 916(1)-916(N) and/or grouped computing resources 914. In at least one embodiment, resource orchestrator 912 may include a software design infrastructure (SDI) management entity for the data center 900. The resource orchestrator 912 may include hardware, software, or some combination thereof.

In at least one embodiment, as shown in FIG. 9, framework layer 920 may include a job scheduler 928, a configuration manager 934, a resource manager 936, and/or a distributed file system 938. The framework layer 920 may include a framework to support software 932 of software layer 930 and/or one or more application(s) 942 of application layer 940. The software 932 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 928 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 928. In at least one embodiment, clustered or grouped computing resources may include grouped computing resource 914 at data center infrastructure layer 910. The resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. Self-modifying actions may relieve a data center operator of data center 900 from making possibly bad configuration decisions and possibly avoiding underutilized and/or poor performing portions of a data center.

The data center 900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 900. In at least one embodiment, trained or deployed machine learning models corresponding to one or more neural networks may be used to infer or predict information using resources described above with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
    providing, to an attestation service, one or more attestation reports generated using one or more graphics processing units (GPUs) and one or more central processing units (CPUs);
    receiving a verification determined using the attestation service and the one or more attestation reports, the verification indicating a presence of a trusted computing base (TCB) corresponding to the one or more GPUs and the one or more CPUs, wherein the TCB is to:
        include GPU state data within the one or more GPUs and a virtual machine (VM) that uses the GPU state data, and
        isolate the GPU state data and the VM from an untrusted host operating system (OS); and
    performing one or more operations using the TCB based at least on the verification.

2. The method of claim 1, wherein the verification includes verifying the one or more attestation reports indicate that the TCB includes a trusted hypervisor that hosts the VM and isolates the VM from the untrusted host OS.

3. The method of claim 1, wherein the verification allows software on the VM to execute one or more portions of one or more application sessions that correspond to the GPU state data.

4. The method of claim 1, wherein:
    the GPU state data corresponds to one or more online multiplayer game sessions hosted using one or more cloud gaming services,
    the one or more cloud gaming services are used to perform the verification, and
    the verification enables software on the VM to participate in the one or more online multiplayer game sessions.

5. The method of claim 1, wherein the one or more attestation reports include:
    one or more first attestation reports corresponding to at least one first chain of trust rooted in the one or more CPUs; and
    one or more second attestation reports corresponding to at least one second chain of trust rooted in the one or more GPUs.

6. The method of claim 1, further comprising:
    receiving one or more first attestation reports from the one or more CPUs; and
    receiving one or more second attestation reports from the one or more GPUs;
    wherein the one or more attestation reports include at least one of the one or more first attestation reports and at least one of the one or more second attestation reports.

7. The method of claim 1, wherein the providing the one or more attestation reports and the performing the one or more operations are performed using the VM.

8. A system comprising:
    processing circuitry to perform operations including:
        receiving, from a host device, first data corresponding to one or more attestation reports generated using one or more graphics processing units (GPUs) and one or more central processing units (CPUs);
        verifying, using the first data, that the one or more attestation reports indicate the host device includes a trusted computing base (TCB), wherein the TCB is to:
            include GPU state data within the one or more GPUs and a virtual machine (VM) that uses the GPU state data, and
            isolate the GPU state data and the VM from an untrusted host operating system (OS); and
        based at least on the TCB being verified using the first data, transmitting second data to the host device, the second data causing the VM to perform one or more operations using the TCB.

9. The system of claim 8, wherein the verifying further includes verifying that the one or more attestation reports indicate that the TCB includes a trusted hypervisor that hosts the VM and isolates the VM from the untrusted host OS.

10. The system of claim 8, wherein the processing circuitry is further to perform operations that comprise executing, based at least on the TCB being verified using the first data, one or more portions of one or more application sessions that correspond to the GPU state data.

11. The system of claim 8, wherein:
    the GPU state data corresponds to one or more online multiplayer game sessions hosted using one or more cloud gaming services,
    the one or more cloud gaming services are used to perform the verifying, and
    allowing, based at least on the TCB being verified, software on the VM to participate in the one or more online multiplayer game sessions.

12. The system of claim 8, wherein first data corresponds to one or more first attestation reports corresponding to at least one first chain of trust rooted in the one or more CPUs, and one or more second attestation reports corresponding to at least one second chain of trust rooted in the one or more GPUs.

13. The system of claim 8, wherein the first data is received from the VM, and the second data is transmitted to the VM.

14. The system of claim 8, wherein the system is comprised in at least one of:
    a control system for an autonomous or semi-autonomous machine;
    a perception system for an autonomous or semi-autonomous machine;
    a system for performing simulation operations;
    a system for performing digital twin operations;
    a system for performing light transport simulation;

a system for performing collaborative content creation for 3D assets;
a system for performing deep learning operations;
a system implemented using an edge device;
a system implemented using a robot;
a system for performing conversational AI operations;
a system for generating synthetic data;
a system for generating or presenting at least one of virtual reality content, augmented reality content, or mixed reality content;
a system implemented at least partially in a data center; or
a system implemented at least partially using cloud computing resources.

15. One or more computer hardware components comprising:
one or more circuits to allow a virtual machine (VM) to perform one or more operations using GPU state data corresponding to one or more GPUs based at least on verifying the one or more operations are to be performed using a trusted computing base (TCB) that isolates the GPU state data of the TCB and the VM of the TCB from an untrusted host operating system (OS).

16. The one or more computer hardware components of claim 15, wherein the verifying includes verifying the TCB includes a trusted hypervisor that hosts the VM and isolates the VM from the untrusted host OS.

17. The one or more computer hardware components of claim 15, wherein the verifying allows software on the VM to execute one or more portions of one or more application sessions that correspond to the GPU state data.

18. The one or more computer hardware components of claim 15, wherein GPU state data corresponds to one or more online multiplayer game sessions hosted using one or more cloud gaming services that are used to perform the verifying, and the verifying allows software on the VM to participate in the one or more online multiplayer game sessions.

19. The one or more computer hardware components of claim 15, wherein the verifying is based at least on analyzing data corresponding to:
one or more first attestation reports from one or more CPUs; and
one or more second attestation reports from the one or more GPUs.

20. The one or more computer hardware components of claim 15, wherein the one or more computer hardware components are comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system for generating or presenting at least one of virtual reality content, augmented reality content, or mixed reality content;
a system implemented at least partially in a data center; or
a system implemented at least partially using cloud computing resources.

21. The one or more computer hardware components of claim 15, wherein the verifying further includes verifying the TCB includes anti-cheat software running on the VM.

* * * * *